United States Patent

Schneider et al.

[11] Patent Number: 5,393,013
[45] Date of Patent: Feb. 28, 1995

[54] AIRCRAFT CABIN DIVIDING DEVICE

[75] Inventors: Uwe Schneider, Achim; Markus Schumacher, Buxtehude, both of Germany

[73] Assignee: Deutsche Aerospace Airbus GmbH, Hamburg, Germany

[21] Appl. No.: 982,860

[22] Filed: Nov. 30, 1992

[30] Foreign Application Priority Data

Dec. 17, 1991 [DE] Germany ............... 4141606

[51] Int. Cl.6 ............................................. B64D 11/00
[52] U.S. Cl. .................... 244/118.5; 160/351
[58] Field of Search ............... 244/118.5, 118.6, 129.4, 244/129.5, 129.1, 121; 160/350, 351; 296/24.1; 297/184, 188

[56] References Cited

U.S. PATENT DOCUMENTS

| | | | |
|---|---|---|---|
| 2,186,510 | 1/1940 | Walter et al. | 160/350 |
| 2,819,901 | 1/1958 | Mateja | 160/351 |
| 3,667,801 | 6/1972 | Setina | 296/24.1 |
| 4,015,875 | 4/1977 | Setina | 296/24.1 |
| 4,134,439 | 1/1979 | Scott | 160/351 |
| 4,185,799 | 1/1980 | Richards, Jr. | 244/118.5 |
| 4,595,227 | 6/1986 | Setina | 296/24.1 |
| 4,597,549 | 7/1986 | Ryan | 244/129.5 |
| 4,899,962 | 2/1990 | Mueller | 244/118.1 |
| 5,054,837 | 10/1991 | Chapman | 160/351 |
| 5,086,540 | 2/1992 | Schumacher | 16/87.4 R |
| 5,168,889 | 12/1992 | Diestel | 297/184 |
| 5,203,363 | 4/1993 | Kidwell et al. | 297/184 |

FOREIGN PATENT DOCUMENTS 2458461  2/1981  France .............. 244/118.5

*Primary Examiner*—Karin L. Tyson
*Assistant Examiner*—Christopher P. Ellis
*Attorney, Agent, or Firm*—W. G. Fasse; W. F. Fasse

[57] ABSTRACT

An aircraft cabin divider is so constructed that its installation can easily be handled by one person taking advantage of the force of gravity. For this purpose the divider has a frame with a first plug-in section that cooperates with a second socket section in the cabin structure, for example, the cabin floor or the cabin seating structure. The plug-in and socket sections cooperate so that an automatic lock-in is accomplished or so that a slight turn will provide the required interlocking. At least two couplings each including a plug-in section and a socket section are provided.

7 Claims, 4 Drawing Sheets

5,393,013

AIRCRAFT CABIN DIVIDING DEVICE

FIELD OF THE INVENTION

The invention relates to an aircraft cabin dividing device, including a frame for holding a curtain and attachment elements for securing the frame to a cabin structure.

BACKGROUND INFORMATION

Such dividing devices are used especially for separating one cabin section from another cabin section, for example, for separating a tourist class section from a first-class section or a business section. It is desirable that such dividers can be placed freely substantially anywhere along the length of the aircraft cabin. Such free movability of the divider is desirable, because the cabin space may thus more easily be adapted to the available number of passengers in one or the other class. Conventionally, adapters are provided which cooperate with channels extending, for example, below the on-board luggage compartments. Such channels are undesirable because they add to the costs of the cabin structure, and because they require an overhead installation of the divider. For this purpose, mounting adapters must be lifted into these channels and a lifting and pushing motion must be made by the flight attendant which requires a certain strength. Additionally, a certain snap-in mechanism must be provided for preventing that the divider slips out of the overhead mounting channel.

As mentioned, the strength required for the overhead mounting is not desirable, since not all flight attendants have the necessary strength, especially since the weight of the divider must be lifted and the insertion into the channel also requires additional strength. Such work is especially undesirable for flight attendants who are not tall enough. Further, if the insertion and locking is not perfectly accomplished, there is the danger that the divider may slip out of its moorings, which is also undesirable, since it may even injure passengers.

Another disadvantage of conventional overhead mountings for cabin dividers is the fact that it is quite difficult to visually check whether the locking into the channel is proper. The conventional mounting adapter requires to, be moved back and forth relative to the mounting channel before a proper position is achieved. Thus, the divider scrapes along the downwardly facing surface of the overhead luggage compartments in the cabin, thereby causing undesirable scratch marks, especially as time passes after repeated insertions.

OBJECTS OF THE INVENTION

In view of the foregoing, it is the aim of the invention to achieve the following objects singly or in combination:
  to provide an aircraft cabin divider that does not require an overhead installation;
  to construct the divider and its mounting so that it can be locked in place, either downwardly or horizontally; and
  to take advantage of gravity for the mounting of the divider in a portion of the cabin structure, such as the seating arrangement or floor of the cabin.

SUMMARY OF THE INVENTION

The aircraft cabin dividing device according to the invention is characterized in that a carrier forming a frame for supporting a curtain or similar divider, is provided at its lower end with a first coupling mechanism that cooperates with a second coupling mechanism forming part of the cabin structure below the divider, whereby the first and second coupling mechanism cooperate with each other in a releasable manner.

Arranging the two coupling mechanisms below or at least in the lower portion of the divider frame has the advantage that the force of gravity can be utilized for the installation of the divider. Thus, gravity helps engaging the two coupling mechanisms, rather than working against the mounting operation. Now it is possible that one person can install the divider and the coupling members are easily visible so that any fumbling for finding the proper match is avoided. Additionally, the person who must install the divider, does not have to stretch so that fatigue and cramps causing body positions are avoided.

In a preferred embodiment the first and second coupling mechanisms form a male and female plug and socket connection, whereby the female socket section is mounted in the back portion, for example, of an arm rest of the seating structure in the cabin. Positioning the divider directly along the back of a row of seats automatically allocates the seats on one side of the divider to one class and the seats on the other side of the divider to the other class in the aircraft cabin. Thus, a separate adjustment of divider steps or separate guide rails are avoided.

Another coupling embodiment according to the invention, also capable of withstanding substantial mechanical loads has a divider holding frame with coupling pins extending at an angle such as a substantially right angle, away from a lower portion of the frame and cooperating with angularly extending sockets secured to the cabin structure for receiving the plugs for forming a plug-in connection. Preferably, the sockets are formed in a horizontal cross-member of a seating arrangement.

An especially stable and sturdy construction is achieved in that each coupling element or rather each male plug-in element is part of a post which fits into a socket that may be installed in a rail recess in which the seats of the aircraft cabin are mounted. The posts are connected to the divider frame. This construction takes efficient advantage of gravity for simply dropping the posts into the sockets. This type of construction requires very little strength on the part of the flight attendant, since the posts extend substantially in the direction of the lateral frame sections, or in parallel thereto. However, the angular or substantially horizontal arrangement of the male and female coupling elements is just as feasible, especially where smaller dividers are involved.

The upper horizontal cross-member of the frame which forms the top of the frame, is preferably constructed as a curtain rod or rail. All frame members or sections are preferably tubular.

The male and female coupling elements are engaged with each other, for example, by a snap-in lock or by a bayonet type of interlocking. Both of these interlocking devices assure a safe interlocking of the divider and the cabin structure, yet also permit an easy connection and disconnection.

A lightweight construction is assured by making the frame as a U-configuration having two vertical side sections interconnected at their upper end by a cross-member forming a curtain rod extending horizontally. High mechanical stability is achieved by forming the frame as a closed frame having two horizontal and two vertical members.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
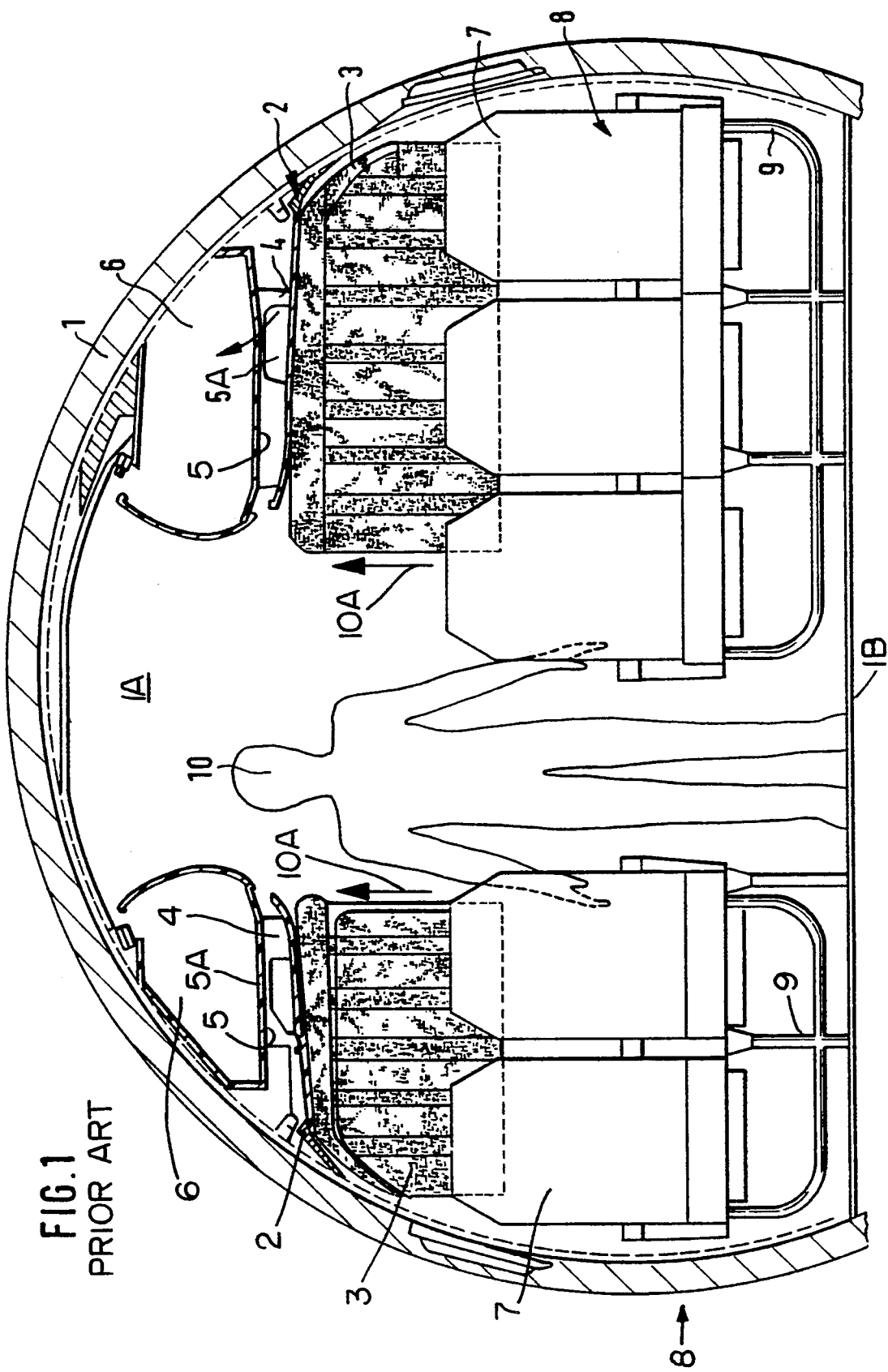
FIG. 1 is a schematical sectional view through an aircraft cabin perpendicularly to the longitudinal aircraft axis showing a conventional arrangement of a cabin divider.

FIG. 1 shows a conventional mounting of two dividers for dividing the cabin space 1A in an aircraft body 1. Each divider comprises a carrier 2 and a mounting adapter 4 secured to the carrier 2 and extending upwardly therefrom toward the respective luggage compartment 6. The adapter 4 fits into a mounting channel 5 in the floor 5A of the respective luggage compartment 6. A curtain 3 is suspended downwardly from the respective carrier 2.

In order to mount these dividers 2, 3, 4 it is necessary for a flight attendant 10 to lift the respective divider as indicated by the arrows 10A against the force of gravity as also indicated by the arrows 10A and then to precisely position the respective divider so that its adapter 4 can slide into the respective mounting channel 5 in a direction toward the cabin aisle. For this purpose, the upwardly directed force must also have a horizontally directed force component so that a proper mounting of the adapter 4 in its respective mounting channel or groove 5 is assured.

The mounting channels 5 are located in a vertical plane just behind the back rests 7 of the seat forming a seating structure 8 mounted to the cabin floor 1B by a seating support structure 9.

Figure 2:
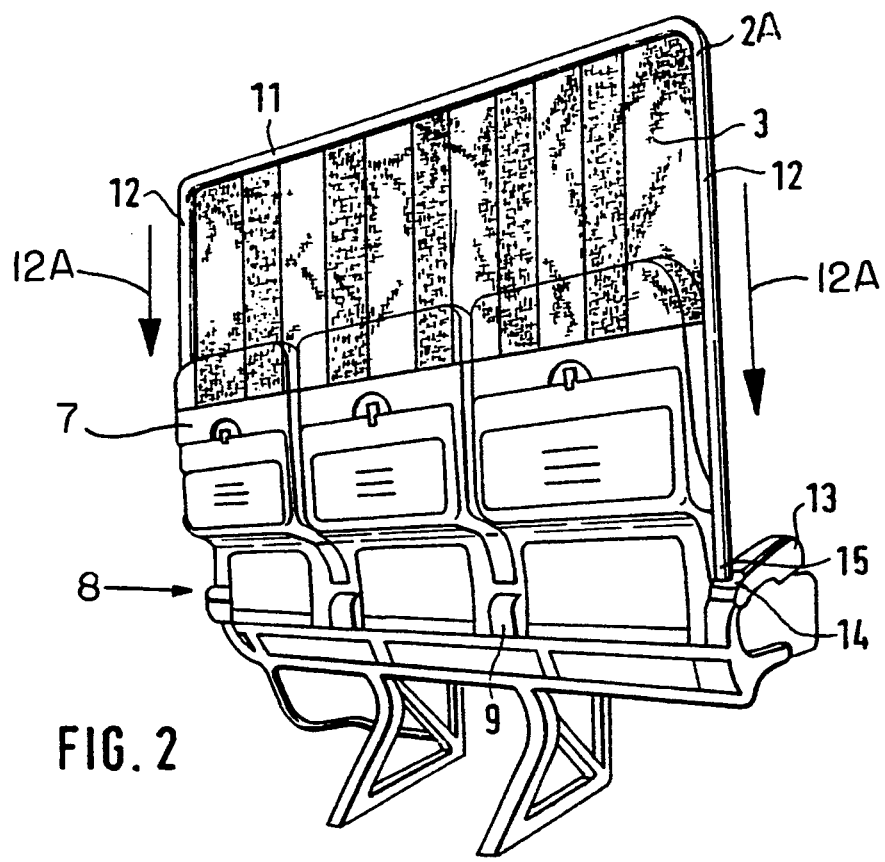
FIG. 2 shows a cabin divider according to the invention, mountable to the rear sections of arm rests of a seating structure in an aircraft cabin.

FIG. 2 illustrates an embodiment according to the invention, in which the carrier 2 with its adapter 4 has been replaced by a divider frame 2A having two vertical side sections 12 interconnected at their upper ends by a cross bar 11, thus forming a downwardly open U-frame configuration carrying the curtain 3 secured to the cross bar 11 functioning as a curtain rod and the curtain 3 reaches with its lower edge downwardly to below the upper edge of the back rests 7 and behind the seating structure 8. As shown in FIG. 2, the downwardly facing edge of the curtain 3 is free to yield to a movement of any back rest 7. The lower end of each vertical frame section 12 is provided with a first coupling member 15 such as a plug-in connector fitting into a socket 14 provided in the rear portion of the arm rest 13. The left-hand side of the frame coupling is identical to that shown on the right-hand side in FIG. 2. The mounting is easy without tools, because the flight attendant merely has to drop the frame with its coupling plugs 15 into the sockets 14 and this operation is aided by gravity as indicated by the arrows 12A. By securing the frame 2A to the arm rests 13, the curtain 3 cannot interfere with the movement of the back rests 7.

Figure 3:
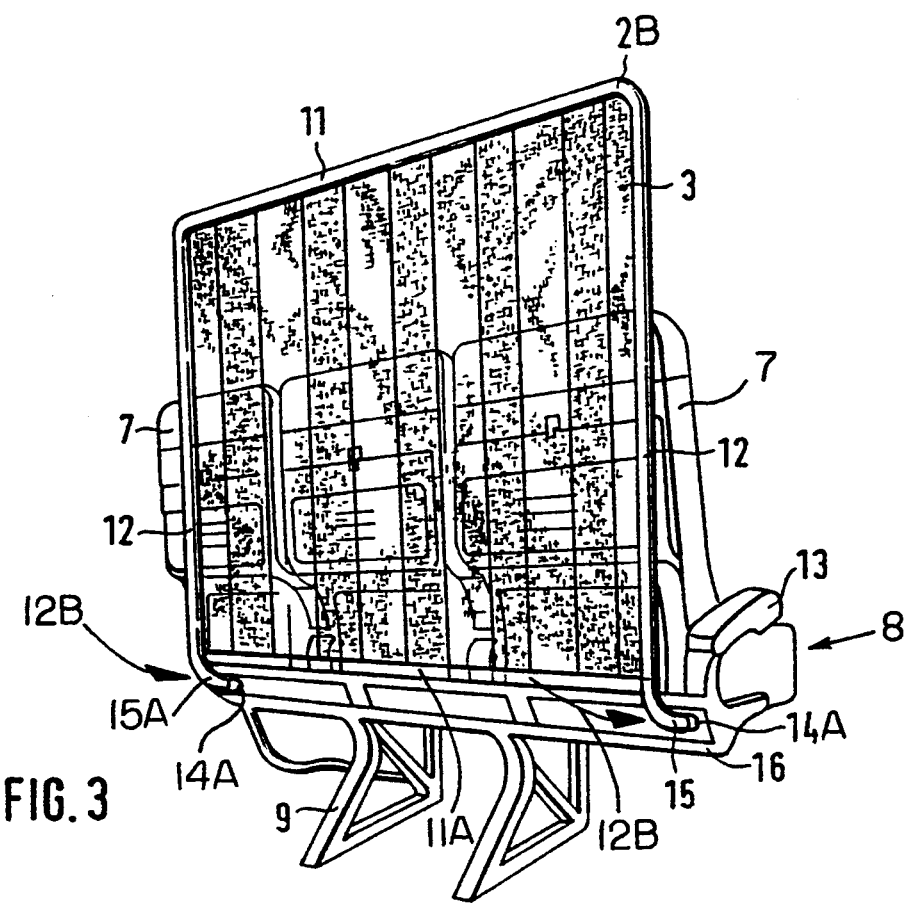
FIG. 3 is a view similar to that of FIG. 2, however showing an embodiment in which the divider frame is secured by angularly or substantially horizontally extending coupling elements.

FIG. 3 shows an embodiment similar to that of FIG. 2, however, the lower ends of the frame 2B form plug-in coupling elements 15A that snap into sockets 14A provided in a cross-piece 9A of the seat support 9 of the seating structure 8. For this purpose, the coupling elements 15A extend at an angle, preferably a right angle relative to the vertical and thus relative to the vertical frame sections 12. Similarly, the plug-in sockets 14A also extend at an angle to the vertical, preferably horizontally. The insertion is still very simple, because the attendant merely has to exert a force in the direction indicated by the arrows 12B. If desired, the frame 2B may be a closed frame by providing a lower cross-bar 11A that interconnects the lower ends of the vertical frame sections 12. In the embodiment of FIG. 3 the curtain 3 also reaches well below the upper edge of the back rests 7 and is free to yield to movements of the back rests 7.

Figure 4:
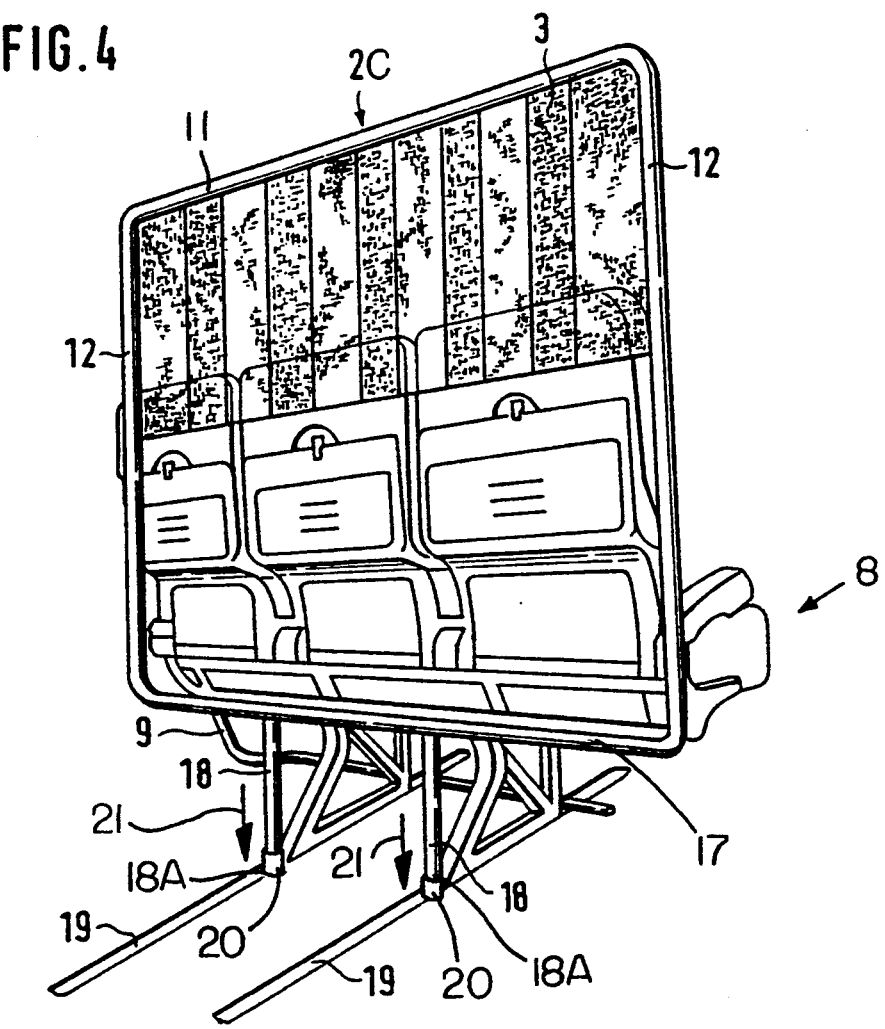
FIG. 4 shows an embodiment with a closed frame and posts securing the frame to the aircraft floor, for example, along the seating rails.

FIG. 4 shows an embodiment with a closed frame 2C having an upper cross-bar 11 that interconnects the upper ends of the two vertical frame sections 12 and a lower cross-bar 17 that interconnects the lower ends of the frame sections 12. Two posts 18 are secured to the lower cross-bar 17 and extend with their plug-in ends 18A into sockets 20, whereby the closed frame 2C with its plug-in post ends 18A may simply be dropped into the sockets as shown by the arrows 21. The sockets 20 are preferably provided in mounting grooves 19 that are conventionally provided in the floor 1B of the cabin structure. The support 9 of the seating structure 8 is also mounted in these grooves 19. Inside the grooves 19 there may be provided mounting rails, not shown, for the seating structure support 9. FIG. 4 also shows that the curtain 3 reaches down to a level below the top of the backrest of the seat structure 8 whereby the curtain 3 can yield to back rest movements.

Figure 5:
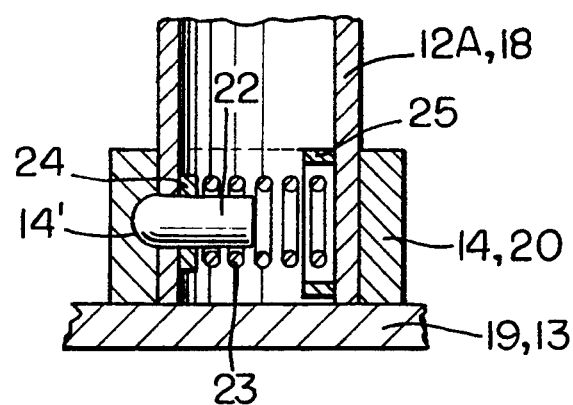
FIG. 5 shows a sectional view through a first coupling mechanism suitable for the present purposes.

FIG. 5 shows a plug-in coupling mechanism suitable for the present purposes. The frame members are tubular members and the first coupling or male portion of the coupling is formed by, the lower end of a tubular member 12A having an outer diameter to fit with a sliding fit into the socket 14 forming the second portion of a coupling. The socket is provided with an internal recess 14' which is engaged by a locking pin 22 biased by a spring 23 bearing against a collar 24 rigidly secured to the pin 22. The other end of the compression spring 23 rests against the inner wall of the tubular member 12A and is held by a mounting 25 against lateral displacement. The plug 22 has a ramp or rounded locking free end which can be disengaged from the recess 14' by an axial force large enough to overcome the force of the spring 23 that biases the pin 27 into the recess 14' in the socket 14. The structure shown in FIG. 5 can be used for all coupling embodiments in FIGS. 2, 3, and 4. For example, the posts 18 may be provided with the structure shown in FIG. 5 and the socket 14, 20 may be arranged for cooperation with the plug-in end of the respective frame section or post.

Figure 6:
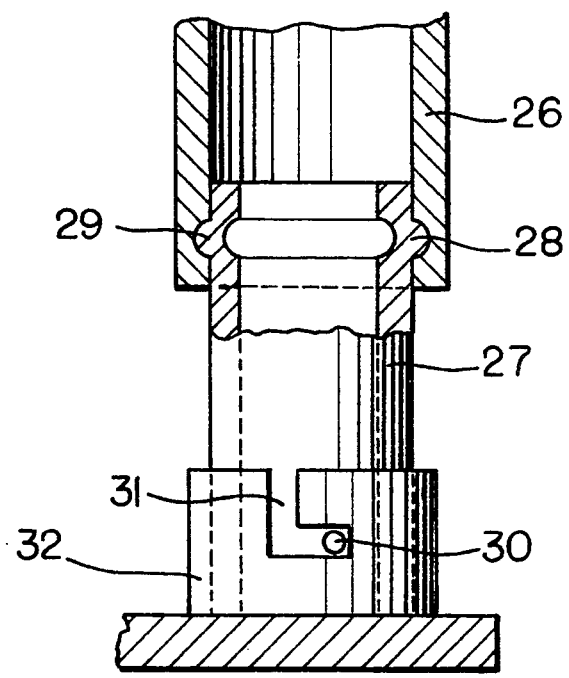
FIG. 6 shows a sectional view through a second coupling device suitable for the present purposes.

FIG. 6 shows an embodiment a plug-in connector in which a tubular member 26 forming part of the divider frame has an extension 27 that is rotatably received in the lower end of the tubular member 26 for rotation about the longitudinal axis. The connection between the members 26 and 27 is, for example, accomplished by a radially outwardly extending bulge 28 in the intermediate extension 27 fitting with a sliding fit into an inner groove 29 inside the lower end of the tubular member 26. This type of construction permits relative rotation between the members 26 and 27, but prevents axial movement therebetween. The intermediate member 26 is provided with a locking pin 30 that reaches into a groove 31 of a socket 32 and can be locked therein by a slight rotational movement. The structure shown in FIG. 6 is also suitable for use in connection with any of the coupling devices.

Although the invention has been described with reference to specific example embodiments, it will be appreciated that it is intended to cover all modifications and equivalents within the scope of the appended claims.

What we claim is:

1. A combination comprising an aircraft cabin, a plurality of passenger seats arranged in rows to form seat structures in said aircraft cabin, and a cabin dividing device for vertically dividing said aircraft cabin into separate cabin sections, said cabin dividing device comprising a divider curtain extending over an area for forming a cabin divider, a divider frame including a curtain rod for suspending said curtain, first plug-in couplers secured to a lower portion of said divider frame, and second plug-in couplers secured to at least one seat structure of said seat structures for cooperating with said first plug-in couplers for locking said divider frame to said at least one seat structure, said first and second plug-in couplers being shaped and oriented for defining a plug-in connection in which gravity facilitates said locking of said divider frame to said at least one seat structure and said plug-in connection is established without using any tool and an overhead mounting of said frame is avoided to permit position adjustment of said cabin dividing device simultaneously with position adjusting said at least one seat structure.

2. The combination of claim 1, wherein said first plug-in couplers comprise at least one male plug, said second plug-in couplers comprising at least one female socket in a plurality of said seat structures for receiving said male plug, said female socket being arranged to face substantially vertically upwardly in a rear portion of an arm rest forming part of said seat structure, whereby said curtain of said cabin divider is positioned behind back rests (7) of said seat structure, and wherein said curtain reaches below an upper edge of said back rest and is independent of any movements of said back rests.

3. The combination of claim 1, wherein said divider frame comprises two vertical sections and an upper horizontal crossbar forming said curtain rod interconnecting said vertical sections, said vertical frame sections having lower ends forming one of said first and second plug-in couplers extending at an angle from the vertical, and wherein said at least one seat structure comprises the other of said first and second plug-in couplers also oriented for cooperation with said plug-in couplers extending at said angle and facing substantially rearwardly from said seat structure thereby forming a plug-in connection, and wherein said curtain reaches below an upper edge of said back rest and is independent of any movements of said back rests.

4. The combination of claim 1, wherein said divider frame comprises side members extending substantially vertically, said first plug-in coupler comprising coupling elements also extending in said vertical direction of said side members.

5. The combination of claim 1, wherein said first and second plug-in couplers comprise spring biased releasable lock-in coupling members for interlocking said first and second plug-in couplers with each other.

6. The combination of claim 1, wherein said divider frame comprises two vertical sections and an upper horizontal cross-bar forming said curtain rod and interconnecting said vertical sections to form a downwardly open U-configuration.

7. The combination of claim 1, wherein said divider frame comprises two vertical sections, an upper horizontal crossbar forming said curtain rod interconnecting said vertical sections to form a top of said frame and a lower horizontal crossbar interconnecting said vertical sections to form a bottom of said frame, whereby a closed frame is formed.

* * * * *